(12) United States Patent
Burnell et al.

(10) Patent No.: US 9,833,738 B2
(45) Date of Patent: Dec. 5, 2017

(54) AIRCRAFT FUEL TANK INERTING SYSTEM

(71) Applicant: AIRBUS OPERATIONS LIMITED, Bristol (GB)

(72) Inventors: Stephen Burnell, Bristol (GB); Tim Leigh, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 14/830,989

(22) Filed: Aug. 20, 2015

(65) Prior Publication Data

US 2016/0051926 A1 Feb. 25, 2016

(30) Foreign Application Priority Data

Aug. 22, 2014 (GB) .................................. 1414930.6

(51) Int. Cl.
*B01D 53/22* (2006.01)
*B64D 37/32* (2006.01)

(52) U.S. Cl.
CPC ............. *B01D 53/22* (2013.01); *B64D 37/32* (2013.01); *B01D 2053/224* (2013.01); *B01D 2257/104* (2013.01); *B01D 2258/06* (2013.01); *B01D 2259/4575* (2013.01); *Y02T 50/44* (2013.01)

(58) Field of Classification Search
CPC .. B01D 53/22; B01D 2053/224; B01D 63/02; B01D 2257/104; B64D 37/32
USPC ............................................................ 95/54
See application file for complete search history.

(56) References Cited

U.S. PATENT DOCUMENTS

| 4,378,920 A * | 4/1983 | Runnels ................ B64D 37/32 137/209 |
| 4,556,180 A * | 12/1985 | Manatt .................. B64D 37/32 244/135 R |
| 7,445,659 B2 | 11/2008 | Schwalm |
| 8,245,978 B1 | 8/2012 | Beers et al. |
| 8,778,062 B1 * | 7/2014 | Snow, Jr. ............... B01D 53/22 95/1 |
| 2004/0226438 A1* | 11/2004 | Jones ..................... B01D 53/22 95/45 |
| 2005/0223895 A1* | 10/2005 | Wong .................... B01D 53/22 95/148 |

(Continued)

FOREIGN PATENT DOCUMENTS

WO 2013079454 A1 6/2013

OTHER PUBLICATIONS

UK Intellectual Property Office Search Report for Application No. GB1414930.6. Mail Date: Mar. 2, 2015.

(Continued)

*Primary Examiner* — Jason M Greene
(74) *Attorney, Agent, or Firm* — Hauptman Ham, LLP

(57) ABSTRACT

A method of generating oxygen depleted air on an aircraft, and an aircraft fuel tank inerting system. The method including the steps of passing a first proportion of air through an air pressure reduction device to produce a supply of reduced pressure air, passing a second proportion along one side of a membrane of an air separation module, exposing the other side of the membrane of the air separation module to the reduced pressure air, so that oxygen is extracted from the second proportion of air across the membrane and the air separation module exhausts oxygen depleted air for inerting an aircraft fuel tank.

9 Claims, 3 Drawing Sheets

(56) References Cited

U.S. PATENT DOCUMENTS

| | | |
|---|---|---|
| 2005/0247197 A1 | 11/2005 | Snow, Jr. |
| 2005/0279208 A1 | 12/2005 | Schwalm |
| 2007/0256558 A1 | 11/2007 | Schwalm |
| 2011/0133033 A1 | 6/2011 | Surawski |
| 2011/0151764 A1* | 6/2011 | Kastell .................. B64D 13/00 454/76 |
| 2012/0103192 A1 | 5/2012 | Lam et al. |
| 2012/0222873 A1 | 9/2012 | Kotliar |
| 2013/0000142 A1 | 1/2013 | Tichborne et al. |
| 2013/0139521 A1 | 6/2013 | Massey et al. |
| 2014/0116249 A1 | 5/2014 | Evosevich et al. |
| 2014/0326135 A1* | 11/2014 | Massey .................. B64D 37/32 95/39 |
| 2016/0052639 A1* | 2/2016 | Burnell .................. B64D 37/32 95/46 |

OTHER PUBLICATIONS

European Search Report dated Jun. 14, 2016 EP Application No. 15184709.

European Search Report dated Jun. 7, 2016 EP Application No. 15184712.

* cited by examiner

AIRCRAFT FUEL TANK INERTING SYSTEM

RELATED APPLICATIONS

The present application claims priority from Great Britain Application Number 1414930.6, filed Aug. 22, 2014, the disclosure of which is hereby incorporated by reference herein in its entirety.

FIELD OF THE INVENTION

The present invention relates to a method of generating oxygen depleted air on an aircraft and an aircraft fuel tank inerting system, and in particular to an aircraft fuel tank inerting system having an air source, an air pressure reduction device, and an air separation module.

BACKGROUND OF THE INVENTION

Certification authorities mandate that newly designed passenger aircraft shall have ignition reduction means applied to their fuel tanks. In the industry, this is commonly known as inerting. Inerting is typically implemented by filling the fuel tanks with oxygen depleted air (ODA) also known as nitrogen enriched air (NEA). Current passenger aircraft fuel tank ignition reduction regulations (FAR25.981) require that fuel tanks are kept inert with the ullage oxygen ($O_2$) concentration at or below 12%.

Known inerting solutions include the use of on-board inerting gas generation systems (OBIGGS), which take an air supply from the aircraft engine bleed air system. The on-board inerting gas generation system commonly employ an air separation module (ASM), which comprise molecular sieves enabling the air to have a proportion of its oxygen filtered off and discarded, leaving ODA to inert the aircraft fuel tanks.

As passenger aircraft engines are typically mounted either on the aircraft wings, or in the aircraft tail region, ducting is required to provide a conduit for the bleed air from the engine, to the on board inerting gas generation system and subsequently to the fuel tanks, which may be located in the wings or in the centre wing box.

Bleed air taken from the engine is done so at temperatures in excess of 100 degrees Celsius (° C.). Therefore the ducting referred to above must be heat insulated, further increasing its weight and space requirements in the aircraft design architecture.

It is undesirable to supply ODA to the aircraft fuel tanks at temperatures in excess of 80° C., and coupled with the fact that the operating efficiency of an ASM is reduced at relatively high temperatures, the bleed air is commonly cooled. Known methods for cooling bleed air include routing the bleed air through a conditioning module prior to the ASM. This further ducting again adds weight and increased space requirements. The weight and power consumption of the conditioning module are also significant. Filtering of the bleed air is also necessary, to prevent contaminants or possibly harmful elements from entering the air separation module, adding weight and further complexity to the ducting arrangement.

The use of engine bleed air reduces engine efficiency, increasing fuel consumption, and limiting the thrust available from each engine.

U.S. Pat. No. 7,445,659 discloses a known method of inerting using a combination of ram air and engine bleed air, with an air separation module.

In U.S. Pat. No. 7,445,659 engine bleed air is used to provide a pressure differential such that the air separation module receives a sufficient flow of ram air. Effectively the ram air is 'pushed towards' the air separation module by the engine bleed air. As described above, when engine bleed air is used in U.S. Pat. No. 7,445,659, conditioning and filtering of the engine bleed air is required.

The present invention seeks to overcome these problems. It is the object of the present invention to provide an improved method of generating oxygen depleted air on an aircraft and an improved aircraft fuel tank inerting system.

SUMMARY OF THE INVENTION

According to the first aspect of the present invention there is provided a method of generating oxygen depleted air on an aircraft comprising the steps of: taking air from a source; passing a first proportion of the air through an air pressure reduction device to produce a supply of reduced pressure air; passing a second proportion of the air along one side of a membrane of an air separation module; exposing the other side of the membrane of the air separation module to the reduced pressure air, so that oxygen passes from the air on said one side of the membrane to the reduced pressure air on said other side of the membrane, exhausting the air from separation module the air as oxygen depleted air, and passing the oxygen depleted air exhausted from the air separation module to a fuel tank on the aircraft for inerting the fuel tank.

Exposing the other side of the membrane of the air separation module to the reduced pressure air increases the rate at which oxygen passes across the membrane of the air separation module, thereby increasing the effectiveness of oxygen depleted air production. The air separation module may be made smaller and lighter as compared with known air separation modules. By using an air pressure reduction device, a negative pressure differential is created to ensure sufficient flow of air through the air separation module, even when the aircraft is stationary. Effectively, the negative pressure differential 'pulls' the air through the air separation module, drawing out the oxygen as it does so. Significantly, no engine bleed air is required.

The air source may be a ram air inlet, such that, in use, atmospheric air collected from the ram air inlet is supplied to both sides of the air separation module.

Atmospheric air collected from the ram air inlet, even at the hottest ambient take off/landing at temperatures, will be well below that of bleed air and at cruise altitude will commonly be in the region of −40° C. That means that no conditioning of the air is required to allow the ASM to function optimally, as would be the case with engine bleed air. That provides weight, space and power savings within the aircraft design architecture as discussed above. Furthermore, this method of generating oxygen depleted air on an aircraft utilises an independent air supply, increasing engine efficiency as compared to a method utilising engine bleed air.

The air pressure reduction device may comprise a vacuum generator, whereby the first proportion of air is passed through a constriction to produce the reduced pressure air supply.

Using a vacuum generator to produce the reduced pressure air by passing the first proportion of air through a constriction provides a passive method with no moving parts.

The method of generating oxygen depleted air on an aircraft may comprise the further step of passing the second proportion of the air through a filter to produce a filtered air supply so that a filtered air supply is passed along one side of the membrane of the air separation module and so that the air separation module exhausts the oxygen depleted air as filtered oxygen depleted air.

The presence of the filter increases the efficiency of the air separation module. The filter acts to remove particulates and excess moisture in the atmospheric air. The filter also advantageously reduces the level of ozone in the air separation module. Ozone destroys the air separation module membrane and therefore increases the maintenance requirement. By utilising atmospheric air from the ram air inlet the filtration requirement is reduced as compared to using engine bleed air. Furthermore, it is not required to filter the first proportion of air which is passed through the air pressure reduction device.

According to the second aspect of the present invention there is provided an aircraft fuel tank inerting system comprising an air source, an air pressure reduction device, and an air separation module, the air separation module having first and second sides separated by a membrane, wherein in use, the first side of the air separation module is supplied with a proportion of the air from the air source, the second side of the air separation module is exposed to a reduced pressure air supply from the air pressure reduction device, so that oxygen passes across the membrane from the first side to the second side of the air separation module and the first side of the air separation module exhausts oxygen depleted air.

Using an air pressure reduction device to supply a reduced pressure air supply on one side of the membrane of the air separation module increases the rate at which oxygen may be removed from the air supply therefore increasing the effectiveness of the air separation module at producing oxygen depleted air.

The aircraft fuel tank inerting system may be arranged such that the air source is a ram air inlet.

In use the ram air inlet provides a constant source of fresh atmospheric air and so the fuel tank inerting system does not require the engine bleed air, reducing the system requirements such as the air conditioning units and heat shielded ducting referred to above.

The ram air inlet may be in the form of a NACA duct.

The NACA duct provides a regular and constant source of air for the fuel tank inerting system when the aircraft is in motion, for a relatively low drag penalty.

Alternatively the fuel tank inerting system may use cabin air exhaust as the air source.

Advantageously the cabin air exhaust is already partially oxygen depleted and conditioned suitably for use in the air separation module.

The aircraft fuel tank inerting system may include a filter, the filter being arranged between the air source and the air separation module.

The filter acts to remove particulates from the air before it enters the air separation module, increasing the effectiveness of the air separation module. Furthermore the filter may be located to be convenient for replacement or cleaning.

The aircraft fuel tank inerting system may additionally comprise a compressor, the compressor being arranged between the air source and the air separation module.

The compressor may act as both a source of high pressure air to pass through the first side of the air separation module and a source of low pressure air to expose to the second side of the air separation module.

The air pressure reduction device may comprise a vacuum generator. The vacuum generator may be venturi based.

The use of a venturi based vacuum generator does not require the use of engine bleed air, nor an electrical power source.

The air separation module may comprise a bundle of hollow fibres, the channel of the hollow fibres defining the first side of the air separation module.

This configuration increases the effective surface area of the membrane thereby supporting efficient oxygen removal.

BRIEF DESCRIPTION OF THE DRAWINGS

Embodiments of the invention will now be described with reference to the accompanying drawings, in which:

In FIG. 1, a passenger aircraft 1 has a fuselage 2 divided into a pressurised cabin region 4 and a non-pressurised centre wing box 6. The centre wing box 6 is bounded by a belly fairing 8. A port and starboard wing 12, 22 extend from a wing root section 14, 24 either side of the centre wing box 6 to respective wing tips 16, 26. Each wing 12, 22 houses a wing fuel tank 18, 28. A centre wing box fuel tank 30 is housed within the centre wing box 8.

DETAILED DESCRIPTION OF EMBODIMENT(S)

The wing fuel tanks 18, 28 and centre wing fuel tank 30 are interconnected via cross feed systems as is known in the art such that fuel may pass between the tanks 18, 28, 30 and together the tanks 18, 28, 30 supply fuel to the aircraft engines (not shown) and the auxiliary power unit (also not shown). The wing fuel tanks 18, 28 and centre wing fuel tank 30 may themselves comprise multiple separate fuel cells, but for simplicity of the description will be termed collectively as aircraft fuel tank 40.

Figure 1:
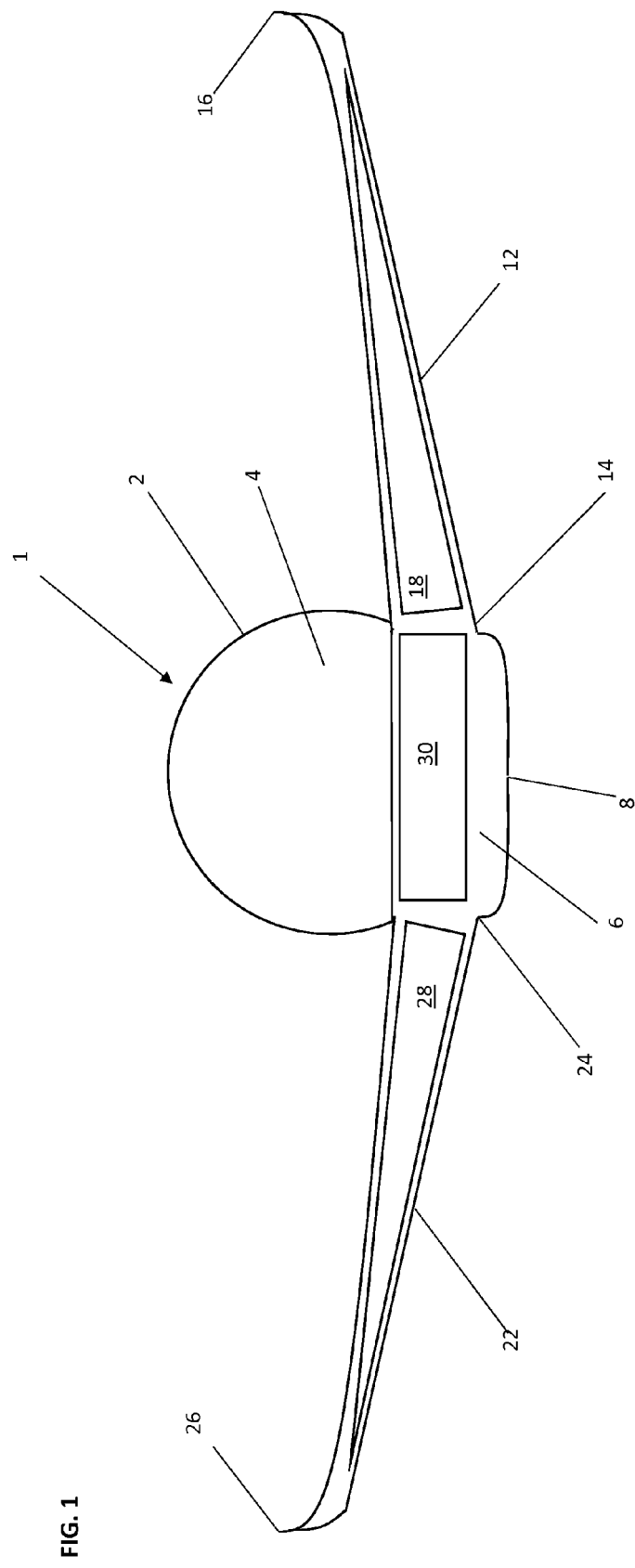
FIG. 1 is schematic of a typical passenger aircraft cross section taken along the aircraft wingspan at the mid plane between the aircraft nose and tail.
Figure 2:
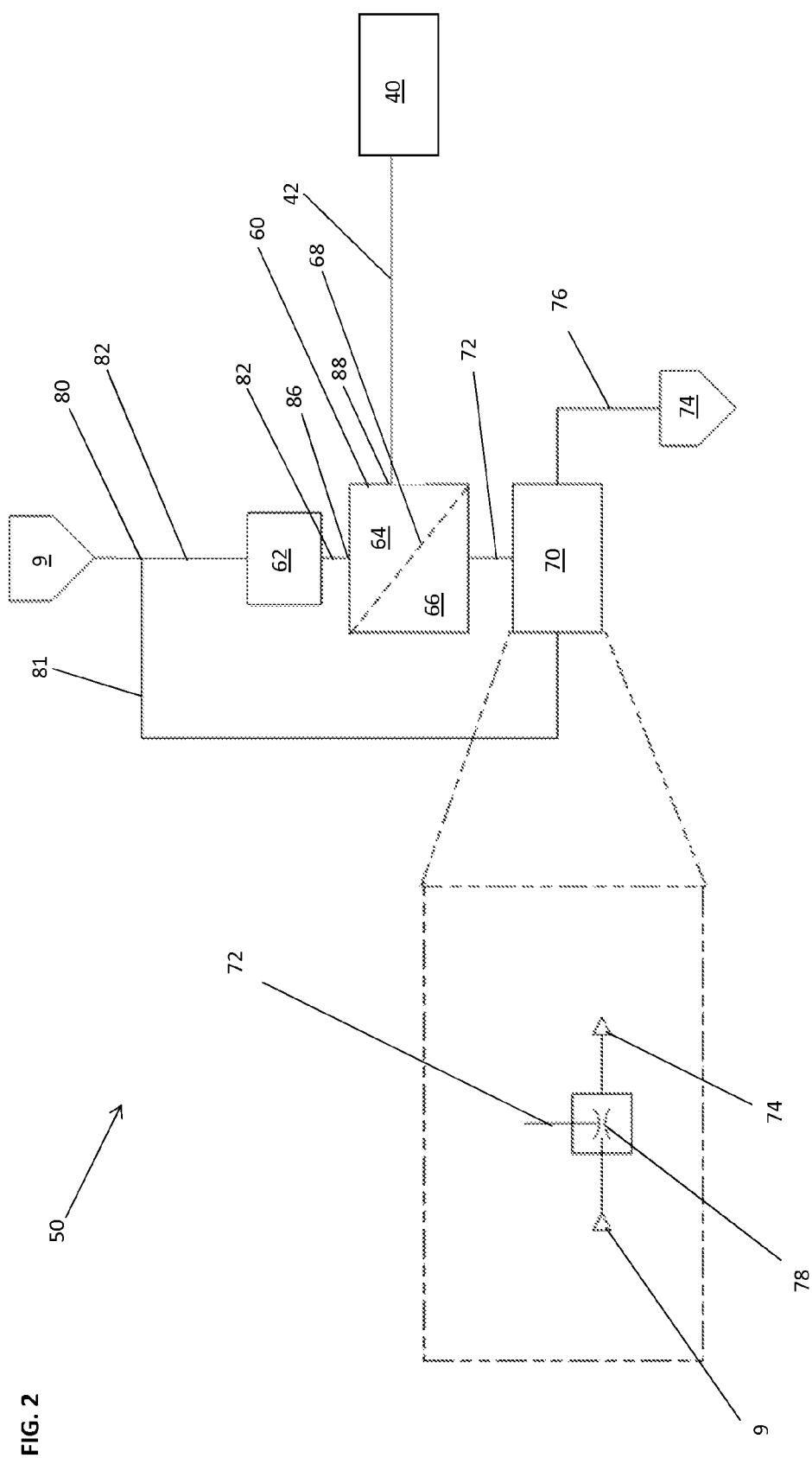
FIG. 2 is a block diagram of the aircraft fuel tank inerting system of the present invention.

The aircraft fuel tank inerting system 50 (see FIG. 2) comprises an air separation module 60 arranged in fluid communication between a NACA duct 9 and an aircraft fuel tank 40.

The air separation module 60 comprises a cylindrical conduit packed with hollow fibres. The walls of the hollow fibres provide a molecular membrane 68, separating the channel within the hollow fibres, collectively designated inerting side 64 and the regions external to the hollow fibres, collectively designated oxygen ($O_2$) extraction side 66. The air separation module has an inlet 86 and an outlet 88. The inlet 86 and the outlet 88 are in fluid communication with the inerting side 64 of the air separation module 60. The operation of the air separation module will be explained in more detail below.

An air filter 62 is provided at the inlet 86 of the air separation module 60. Inerting gas conduit 42 fluidly connects the outlet 86 of the air separation module to the fuel tank 40.

An air pressure reduction device 70, in this case a venturi based vacuum generator is arranged in fluid communication between the NACA duct 9 and an exhaust 74 exposed to the atmosphere. The air pressure reduction device 70 includes a constriction 78, which is fluidly connected to the $O_2$ extraction side 66 of the air separation module 60. The operation of the air pressure reduction device 70 will be explained in more detail below.

Figure 3:
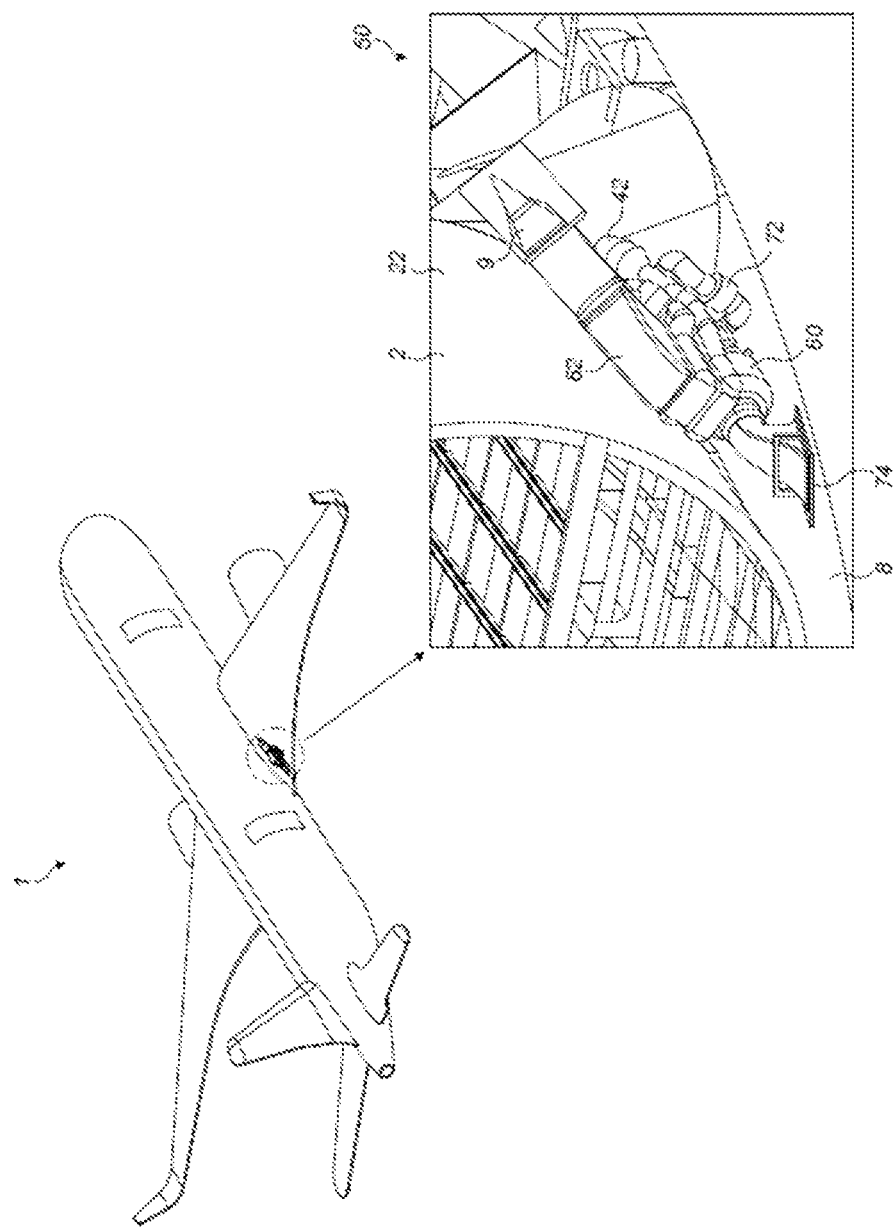
FIG. 3 is a perspective view of a typical passenger aircraft with an enlarged cutaway section to reveal the aircraft fuel tank inerting system of the present invention.

The aircraft fuel tank inerting system 50 is arranged (see FIG. 3) in the region aft of the starboard wing root 24 and centre wing box 6, where the starboard wing 22 and belly fairing 8 intersect. The NACA duct 9 is arranged in an upper surface of the trailing edge of the starboard wing and exposed to atmospheric air. The exhaust 74 is arranged in a lower surface of the trailing edge of the starboard wing and exposed to atmospheric air.

In operation, ducting divides the atmospheric air collected by the NACA duct 9 at a junction 80, with a first proportion of the air passed to the air pressure reduction device 70 via conduit 81 and a second proportion of the air passed to the inerting side 64 of the air separation module 60 via conduit 82.

The second proportion of atmospheric air passing along conduit 82 is filtered by air filter 62 before entering the inerting side 64 of the air separation module 60.

The first proportion of atmospheric air passing along conduit 81 is accelerated by the constriction 78 within pressure reduction device 70 and exits the pressure reduction device via exhaust conduit 76 to exhaust 74. In the region of the constriction 78, a reduced pressure conduit 72 fluidly connects the constriction 78 of the pressure reduction device 70 and the $O_2$ extraction side 66 of the air separation module 60.

This exposes reduced pressure air to the $O_2$ extraction side 66 of the air separation module 60, so that $O_2$ passes from the air on inerting side 64 of the air separation module 60 to the reduced pressure air on the $O_2$ extraction side 66 of the air separation module 60, across the molecular membrane 68. This additional $O_2$ is drawn into the pressure reduction device 70 via the reduced pressure conduit 72 and exits the pressure reduction device via exhaust conduit 76 to exhaust 74. The air on the inerting side 64 of the air separation module 60 is exhausted from the air separation module at outlet 88 as oxygen depleted air. The oxygen depleted air is passed to the aircraft fuel tank 40 via inerting gas conduit 42. To replace the ullage in the aircraft fuel tank 40 the oxygen depleted air must be at a higher pressure than the atmospheric pressure of the fuel tank vent.

In an alternate embodiment, cabin air exhaust may be supplied to the air separation module.

In an alternate embodiment, the air source may be a positive pressure artificially applied to the ram air inlet. This may be through the use of an air compressor provided on-board the aircraft or it may be provided by ground handling equipment, and used whilst the aircraft is stationary at an airport, for example. As long as the oxygen depleted air is generated at a positive pressure relative to the fuel tank vent the ullage will be replaced by the oxygen depleted air.

In an alternate embodiment, the positive pressure artificially applied to the ram air inlet by the air compressor may be used in combination with the vacuum also generated by the air compressor. The vacuum is fluidly connected to the oxygen extraction side 66 of the air separation module 60, to expose the oxygen extraction side 66 to reduced pressure air. Again, the air compressor acting both as positive pressure source and vacuum source may be provided on-board the aircraft or it may be provided by ground handling equipment, and used whilst the aircraft is stationary at an airport, for example.

In yet another alternate embodiment, the reduced pressure air may be exposed to the oxygen extraction side 66 from a tank. The tank may be provided on-board the aircraft or it may be provided by ground handling equipment, and used whilst the aircraft is stationary at an airport, for example.

The additional $O_2$ drawn into the pressure reduction device 70 via the reduced pressure conduit 72 may alternatively be collected for use in crew and/or passenger cabin environment control or stored for emergency use.

The invention claimed is:

1. A method of generating oxygen depleted air on an aircraft comprising the steps of: taking air from a source, wherein the air source is a ram air inlet, such that, in use, atmospheric air collected from the ram air inlet is supplied to both sides of the air separation module;

passing a first proportion of the atmospheric air through an air pressure reduction device to produce a supply of reduced pressure atmospheric air; passing a second proportion of the atmospheric air through a filter to produce a filtered atmospheric air supply, the first proportion of atmospheric air bypassing the filter; passing the filtered atmospheric air along one side of a membrane of an air separation module, so that a filtered air supply is passed along one side of the membrane of the air separation module; exposing the other side of the membrane of the air separation module to the reduced pressure atmospheric air, so that oxygen passes from the filtered atmospheric air on said one side of the membrane to the reduced pressure atmospheric air on said other side of the membrane, exhausting the filtered atmospheric air from the air separation module as filtered oxygen depleted atmospheric air; and passing the filtered oxygen depleted atmospheric air exhausted from the air separation module to a fuel tank on the aircraft for inerting the fuel tank.

2. A method of generating oxygen depleted air on an aircraft according to claim 1 wherein the air pressure reduction device comprises a vacuum generator, whereby the first proportion of air is passed through a constriction to produce the reduced pressure air supply.

3. An aircraft fuel tank inerting system comprising:
a ram air inlet,
an air pressure reduction device,
an air separation module, the air separation module having first and second sides separated by a membrane, wherein in use, the first side of the air separation module is supplied with a proportion of the atmospheric air from the ram air inlet, the second side of the air separation module is exposed to a reduced pressure atmospheric air supply from the air pressure reduction device, so that oxygen passes across the membrane from the first side to the second side of the air separation module and the first side of the air separation module exhausts oxygen depleted atmospheric air, with an outlet configured to pass the oxygen depleted atmospheric air to an aircraft fuel tank for inerting the fuel tank, and
a filter arranged between the ram air inlet and the air separation module, wherein in use, the proportion of the atmospheric air supplied to the first side of the air separation module is passed through the filter, and a proportion of atmospheric air supplied to the air pressure reduction device bypasses the filter.

4. An aircraft fuel tank inerting system according to claim 3, wherein the ram air inlet is in the form of a NACA duct.

5. An aircraft fuel tank inerting system according to claim 3 additionally comprising a compressor, the compressor being arranged between the air source and the air separation module.

6. An aircraft fuel tank inerting system according to claim 3 wherein the air pressure reduction device comprises a vacuum generator.

7. An aircraft fuel tank inerting system according to claim 6, wherein the vacuum generator is venturi based.

8. An aircraft fuel tank inerting system according to claim 3, where the air separation module comprises a bundle of hollow fibres, the channel of the hollow fibres defining the first side of the air separation module.

9. An aircraft incorporating the aircraft fuel tank inerting system according to claim 3.

* * * * *